United States Patent
Baek et al.

(10) Patent No.: US 9,736,346 B2
(45) Date of Patent: *Aug. 15, 2017

(54) IMAGING SYSTEM IMPROVING IMAGE RESOLUTION OF THE SYSTEM WITH LOW RESOLUTION IMAGE SENSOR

(75) Inventors: Sang Hyune Baek, Suwon (KR); Gyoung Il Cho, Seoul (KR); Cheong Soo Seo, Seongnam (KR)

(73) Assignees: Stereo Display, Inc, Anaheim, CA (US); Angstrom, Inc, Seongnam (KR)

(*) Notice: Subject to any disclaimer, the term of this patent is extended or adjusted under 35 U.S.C. 154(b) by 1171 days.

This patent is subject to a terminal disclaimer.

(21) Appl. No.: 11/382,273

(22) Filed: May 9, 2006

(65) Prior Publication Data

US 2007/0263113 A1 Nov. 15, 2007

(51) Int. Cl.
*H04N 5/225* (2006.01)

(52) U.S. Cl.
CPC .................................. *H04N 5/2254* (2013.01)

(58) Field of Classification Search
USPC ................. 348/36–39, 219.1, 239, 340, 344
See application file for complete search history.

(56) References Cited

U.S. PATENT DOCUMENTS

| | | | |
|---|---|---|---|
| 2,002,376 A | 5/1935 | Mannheimer | |
| 4,407,567 A | 10/1983 | Michelet | |
| 4,834,512 A | 5/1989 | Austin | |
| 5,004,319 A | 4/1991 | Smither | |
| 5,212,555 A | 5/1993 | Stoltz | |
| 5,369,433 A | 11/1994 | Baldwin | |
| 5,402,407 A | 3/1995 | Eguchi | |
| 5,467,121 A | 11/1995 | Allcock | |
| 5,612,736 A | 3/1997 | Vogeley | |
| 5,696,619 A | 12/1997 | Knipe | |
| 5,881,034 A | 3/1999 | Mano | |
| 5,897,195 A | 4/1999 | Choate | |
| 5,986,811 A | 11/1999 | Wohlstadter | |
| 6,025,951 A | 2/2000 | Swart | |
| 6,028,689 A | 2/2000 | Michaliek | |
| 6,064,423 A | 5/2000 | Geng | |
| 6,084,843 A | 7/2000 | Abe | |
| 6,104,425 A | 8/2000 | Kanno | |
| 6,111,900 A | 8/2000 | Suzudo | |
| 6,123,985 A | 9/2000 | Robinson | |
| 6,282,213 B1 | 8/2001 | Gutin | |
| 6,315,423 B1 | 11/2001 | Yu | |
| 6,329,737 B1 | 12/2001 | Jerman | |
| 6,498,673 B1 | 12/2002 | Frigo | |

(Continued)

FOREIGN PATENT DOCUMENTS

| | | |
|---|---|---|
| JP | 08-043881 | 2/1996 |
| JP | 11-069209 | 3/1999 |
| JP | 2002-288873 | 10/2002 |

*Primary Examiner* — Timothy J Henn (57) ABSTRACT

The present invention provides an imaging system generating a high resolution image using low resolution images taken by a low resolution image sensor. Also, the imaging system generates a wide angle of view image. Enhancement of resolution and enlargement of angle of view are accomplished by optical axis change, utilizing one or more micromirror array lenses without macroscopic mechanical movements of lenses. The imaging system also provides zoom and auto focusing functions using micromirror array lenses.

21 Claims, 8 Drawing Sheets

(56) References Cited

U.S. PATENT DOCUMENTS

| | | |
|---|---|---|
| 6,507,366 B1 | 1/2003 | Lee |
| 6,549,730 B1 | 4/2003 | Hamada |
| 6,625,342 B2 | 9/2003 | Staple |
| 6,649,852 B2 | 11/2003 | Chason |
| 6,650,461 B2 | 11/2003 | Atobe |
| 6,658,208 B2 | 12/2003 | Watanabe |
| 6,700,606 B1 * | 3/2004 | Borza ............... 348/218.1 |
| 6,711,319 B2 | 3/2004 | Hoen |
| 6,741,384 B1 | 5/2004 | Martin |
| 6,784,771 B1 | 8/2004 | Fan |
| 6,833,938 B2 | 12/2004 | Nishioka |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,943,950 B2 | 9/2005 | Lee |
| 6,947,076 B1 * | 9/2005 | Kitaguchi et al. ......... 348/218.1 |
| 6,958,777 B1 | 10/2005 | Pine |
| 6,970,284 B1 | 11/2005 | Kim |
| 6,995,909 B1 | 2/2006 | Hayashi |
| 6,999,226 B2 | 2/2006 | Kim et al. |
| 7,023,466 B2 | 4/2006 | Favalora et al. |
| 7,031,046 B2 | 4/2006 | Kim et al. |
| 7,046,447 B2 | 5/2006 | Raber |
| 7,068,416 B2 | 6/2006 | Gim et al. |
| 7,077,523 B2 | 7/2006 | Seo et al. |
| 7,161,729 B2 | 1/2007 | Kim et al. |
| 7,286,164 B2 * | 10/2007 | Shinohara et al. ........ 348/219.1 |
| 2002/0018407 A1 | 2/2002 | Komoto |
| 2002/0102102 A1 | 8/2002 | Watanabe |
| 2002/0135673 A1 | 9/2002 | Favalora |
| 2003/0058520 A1 | 3/2003 | Yu |
| 2003/0071125 A1 | 4/2003 | Yoo |
| 2003/0174234 A1 | 9/2003 | Kondo |
| 2003/0184843 A1 | 10/2003 | Moon |
| 2004/0009683 A1 | 1/2004 | Hiraoka |
| 2004/0012460 A1 | 1/2004 | Cho |
| 2004/0021802 A1 | 2/2004 | Yoshino |
| 2004/0052180 A1 | 3/2004 | Hong |
| 2004/0246362 A1 | 12/2004 | Konno |
| 2004/0252958 A1 | 12/2004 | Abu-Ageel |
| 2005/0024736 A1 | 2/2005 | Bakin |
| 2005/0057812 A1 | 3/2005 | Raber |
| 2005/0136663 A1 | 6/2005 | Terence Gan |
| 2005/0174625 A1 | 8/2005 | Huiber |
| 2005/0180019 A1 | 8/2005 | Cho |
| 2005/0206773 A1 * | 9/2005 | Kim et al. ................... 348/340 |
| 2005/0212856 A1 | 9/2005 | Temple |
| 2005/0224695 A1 | 10/2005 | Mushika |
| 2005/0225884 A1 | 10/2005 | Gim |
| 2005/0231792 A1 | 10/2005 | Alain |
| 2005/0264870 A1 | 12/2005 | Kim |
| 2005/0275928 A1 * | 12/2005 | Kim et al. ................... 359/291 |
| 2006/0012766 A1 | 1/2006 | Klosner |
| 2006/0012852 A1 | 1/2006 | Cho |
| 2006/0028709 A1 | 2/2006 | Cho |
| 2006/0187524 A1 | 8/2006 | Sandstrom |
| 2006/0209439 A1 | 9/2006 | Cho |
| 2007/0040925 A1 * | 2/2007 | Hicks ........................... 348/340 |

* cited by examiner

IMAGING SYSTEM IMPROVING IMAGE RESOLUTION OF THE SYSTEM WITH LOW RESOLUTION IMAGE SENSOR

FIELD OF INVENTION

The present invention relates to an imaging system providing high resolution images with a low resolution image sensor.

BACKGROUND OF THE INVENTION

A high resolution imaging system with compact size, light weight, high speed, low power consumption, and low cost is in high demand. Resolution can be defined in many ways. In this disclosure, image resolution means spatial image resolution which is defined as the number of picture elements used to represent an image captured with a given field of view and depends on mainly image sensor resolution. Image sensor resolution is determined by various factors including the size of the image sensor and the pixel size of the image sensor. To provide high image sensor resolution for a given pixel size, the size of the image sensor needs to be increased, which causes the aperture and the focal length of an imaging system to be increased. Such an imaging system tends to become bulky and heavy as well as cost more. To increase image sensor resolution for a given size of the image sensor, the pixel density needs to be increased by reducing the pixel size. Smaller pixel, however, has less sensitivity. Increasing image sensor resolution can cause other problems including more processing time, more power consumption, and higher cost. Advantages using a low resolution image sensor in the imaging system include low cost, low volume, low power consumption, and possibly high sensitivity by increasing the pixel size for a given size of the image sensor. There are a few approaches to increase image resolution without increasing image sensor resolution. They are categorized as either mosaic or super resolution approaches.

In the mosaic method, a plurality of magnified sectional images of an object obtained from a lower resolution image sensor is stitched by an image processor to generate a single higher resolution composite image of the object. U.S. Pat. No. 6,710,801 to Kubo discloses an image taking and processing device comprising an image taking lens having zoom functionality. The system of Kubo improves image resolution only for central area.

U.S. Pat. No. 4,383,170 to Takagi discloses an image input device comprising image dividing means including shutter means and an compound eye lens to generate partial images of an object. The device yields complicated structures while providing a fixed resolution unless shutter means and the compound eye lens are replaced.

U.S. Pat. No. 6,639,625 to Ishida discloses an image sensing device comprising a movable image sensing optical unit having first and second focal lengths. The direction control unit of Ishida moves a whole housing containing an optical unit and an image sensor, resulting in a complicated driving mechanism.

In the super resolution method, a plurality of low resolution images with subpixel relative displacements is fused to generate a single higher resolution image. Various data fusion algorithms are introduced by M. Elad and A. Feuer, "Restoration of a Single Superresolution Image from Several Blurred, Noisy, and Undersampled Measured Images," *IEEE Transactions on image processing*, Vol. 6, No. 12, December 1997.

U.S. Pat. No. 6,686,956 to Prakash discloses an increased resolution imaging device comprising an optical wedge assembly to obtain multiple images using the super resolution method. The improvement of resolution is limited by the shape of the optical wedge. Also, the actuator moving the wedge assembly uses a macroscopic servo mechanism which can induce vibration and time delay causing deterioration of the image quality.

U.S. Pat. No. 7,003,177 to Mendlovic discloses an image sensing device comprising a periodically patterned mask and a motion generator generating multiple fields of view, related to one another by sub-pixel shifts. The system of Mendlovic does not include details how to generate multiple fields of view.

Both mosaic and super resolution methods require the change of an optical axis. Those methods can be used effectively to produce high resolution images in real-time when the optical axis of an imaging system is changed in high precision, high speed, and large range. Also, the optical axis change of the imaging system facilitates advanced features such as providing true panoramic images. In conventional digital cameras, a panoramic image is provided by simply cropping the top and bottom portion of a captured image, while actual panoramic cameras have complicated structures including rotating or swing lens to provide a wide angle of view. The imaging system having a variable optical axis enables a wide angle of view to produce true panoramic images without increasing complexity and cost.

Conventional imaging system does not provide optical axis change unless it adds bulky structure and cost. To provide a high image resolution, compact size, light weight, high speed, low power consumption, and low cost imaging system, the imaging system having the capability of fast and precise optical axis change is provided.

SUMMARY OF THE INVENTION

An objective of the invention is to provide an imaging system which provides a high resolution image using a low resolution image sensor.

Another objective of the invention is to provide an imaging system that enhances image resolution using a mosaic method. An object area is divided into a plurality of small sectional object areas, of which size and location are determined by a desired image resolution given by a user. To take a sectional image for each sectional object area, the optical axis of an imaging system is changed to point the sectional object area and the sectional object area is magnified by a certain factor, which is also determined by the desired image resolution. When all sectional object images are obtained, an image processing unit stitches these sectional object images to generate a single high resolution composite image. In ideal situation, since each sectional object image has resolution equivalent to image sensor resolution, composite image resolution becomes the product of the number of sectional object images and image sensor resolution. In practice, however, the movement of the imaging system during taking multiple images needs to be considered. Thus, sectional object images are taken so that adjacent sectional object images are overlapped with one another to a certain degree. In the present invention, the optical axis and magnification of the imaging system are changed by micromirror array lenses (MMALs).

The MMAL comprises a plurality of micromirrors to reflect light. The following U.S. patents and applications describe the MMAL: U.S. Pat. No. 6,934,072 to Kim, U.S. Pat. No. 6,934,073 to Kim, U.S. patent application Ser. No.

10/855,554 filed May 27, 2004, U.S. patent application Ser. No. 10/855,715 filed May 27, 2004, U.S. patent application Ser. No. 10/857,714 filed May 28, 2004, U.S. patent application Ser. No. 10/857,280 filed May 28, 2004, U.S. patent application Ser. No. 10/893,039 filed May 28, 2004, and U.S. patent application Ser. No. 10/983,353 filed Mar. 4, 2005, all of which are hereby incorporated by reference.

The MMAL comprising micromirrors provides a very fast response time, a large focal length variation, a high optical focusing efficiency, a simple focusing structure, low power consumption, and a low production cost because of the advantage of the mass productivity. Also, the MMAL is an adaptive optical component which compensates for the aberration of the system and changes the optical axis without macroscopic mechanical movements of lenses. The translation and/or rotation of each micromirror of the MMALs are controlled to change the focal length and the optical axis of the imaging system. Each micromirror of the MMALs is actuated by electrostatic force and/or electromagnetic force.

Still another objective of the invention is to provide an imaging system that enhances image resolution using a super resolution method. An object is imaged a plurality of times with subpixel relative displacements. The number of images is determined by a desired image resolution given by a user. The image processing unit fuses these images using one of data fusion algorithms to generate a single high resolution composite image. In the present invention, taking multiple images with subpixel relative displacements is accomplished by the optical axis change of the MMALs.

Still another objective of the invention is to provide an imaging system offering true panoramic (wide angle) images. Conventional amateur digital camera provides a panoramic image by cropping the top and bottom portion of a captured image. To enlarge the actual angle of view, a plurality of sectional images can be taken by changing an optical axis. Then, an image processing unit stitches these sectional images to generate a panoramic image. The optical axis is changed by the MMALs.

Still another objective of the invention is to provide an imaging system having zoom capability. The zoom system comprises at least one MMAL. A zoom system changing the magnification of an imaging system without macroscopic mechanical movements of lenses comprises a first MMAL and a second MMAL. The focal length of each MMAL is changed to form an image in-focus at a given magnification. The zoom system may further include a focus lens group, an elector lens group and a relay lens group. The first MMAL forms a variator lens group, and the second MMAL forms a compensator lens group.

Still another objective of the invention is to provide an imaging system having an auto focusing function. Especially, in the mosaic method or the panoramic mode, objects in sectional object areas may have different distances from the imaging system. The auto focusing system provides correct focus for each sectional image so that a composite image has better image quality. The auto focusing systems using the MMAL are described in U.S. patent application Ser. No. 10/896,146 and U.S. patent application Ser. No. 11/208,114, the contents of which are hereby incorporated by reference.

Still another objective of the invention is to provide an imaging system that can compensate the aberration of the system. Since the MMAL is an adaptive optical component, the imaging system can compensate for the aberration of the system by controlling each micromirror of the MMAL. The aberration of the system includes, but not limited to, phase errors of light introduced by the medium between an object and its image and the defects of the imaging system that may cause the image to deviate from the rules of paraxial imagery. The MMAL is further controlled to satisfy the same phase condition for each wavelength of Red, Green, and Blue (RGB), respectively, to get a color image.

Still another objective of the invention is to provide a real-time imaging system providing high resolution images from a low resolution image sensor using fast optical axis change.

Still another objective of the invention is to provide a real-time imaging system providing wide angle of view images using fast optical axis change.

The imaging system may further comprise optical filters for image enhancement.

The imaging system of the present invention has advantages: (1) the system provides a high resolution composite image using a low resolution image sensor; (2) the system provides a wide angle of view; (3) the system has a compact and light structure because the size of the image sensor is small and there is no macroscopic mechanical movements of lenses; (4) the system is inexpensive because the low resolution image sensor and the MMAL are inexpensive and the macroscopic mechanical movements of lenses are not necessary; (5) the system has a compact zoom system; (6) the system has a very high zooming speed; (7) the system has a large variation of magnification; (8) the system has a high optical efficiency; (9) the system provides an auto focusing function; (10) the system compensates for the aberration of the system; and (11) the system requires small power consumption because the number of pixels of the image sensor is small and the MMAL is actuated by electrostatic force.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with reference to the accompanying drawings, wherein:

FIG. 9b is an exploded schematic side view of the auto focusing lens system of FIG. 9a.

DETAILED DESCRIPTION OF THE INVENTION

Figure 1:
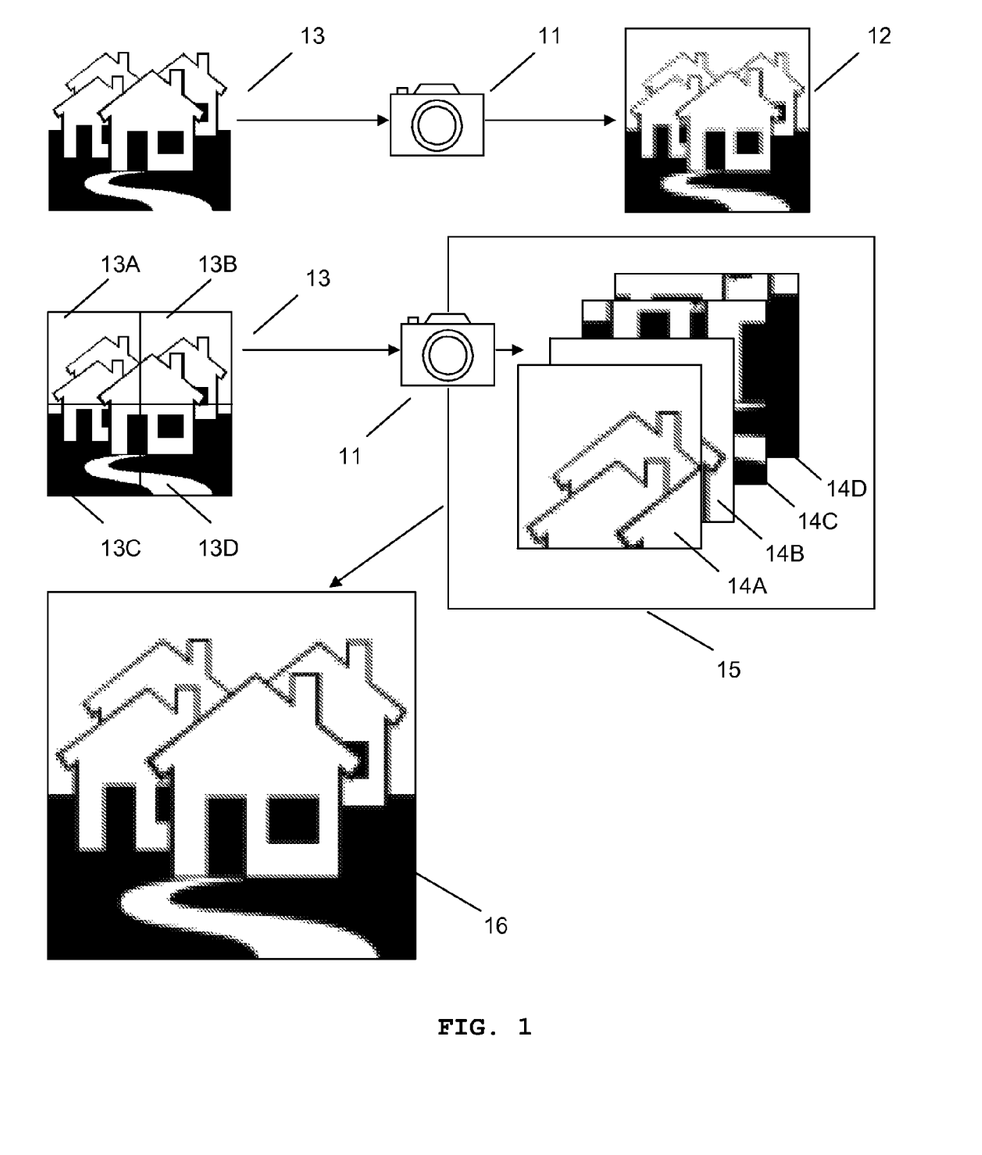
FIG. 1 shows an illustrative representation of an exemplary imaging system having a low resolution image sensor, which improves image resolution by a mosaic method.
Figure 4:
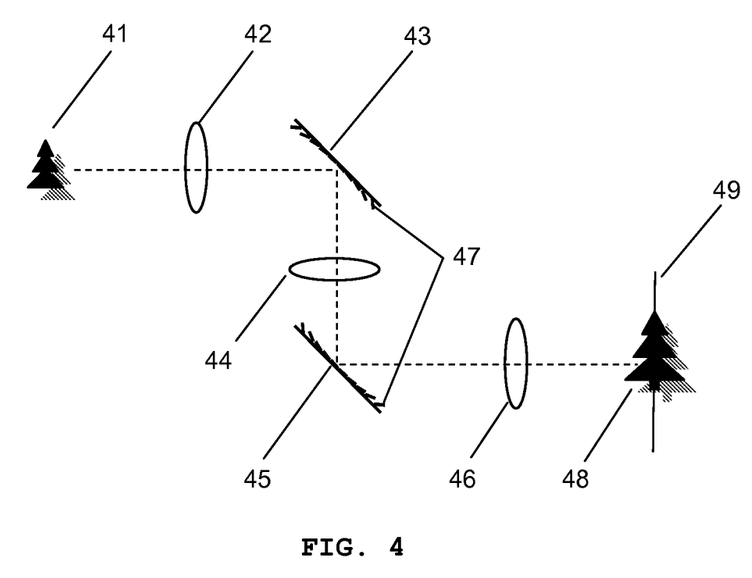
FIG. 4 illustrates an imaging system which provides zoom function (continuous magnification), optical axis change, and auto focusing function according to the preferred embodiment of the present invention using micromirror array lenses (MMALs)

FIG. 1 shows an illustrative exemplary imaging system 11 having a low resolution image sensor, which improves image resolution by a mosaic method. A user chooses a desired image resolution; preferably, integer times of image sensor resolution although it is not necessary. The desired image resolution determines other variables including the amount of magnification and pointing directions of an optical axis. Values of variables can be calculated in real-time in an arithmetic unit or calculated in advance for predetermined resolutions and stored in the arithmetic unit. The highest feasible composite image resolution depends on the zoom range and optical axis variation range of the imaging system. In the normal operation of the imaging system 11, the image 12 of an object 13 has the same resolution as that of the image sensor. The user may need a higher resolution image because the image 12 does not show enough details of the object 13. When the higher resolution image is required, an object area is divided into a plurality of sections. In our example, horizontal and vertical resolutions of the image need to be increased by factor two, respectively. The object area is divided into four sections 13A, 13B, 13C, and 13D, and magnified by factor two. Then, the imaging system 11 sequentially varies the direction of the optical axis to point the center of each sectional object area 13A, 13B, 13C, and 13D, and takes sectional images 14A, 14B, 14C, and 14D. Since a smaller area is imaged by the same image sensor that produces the image 12, more details is shown. These sectional images are stitched by an image processor 15 to generate a single high resolution composite image 16. Comparing images 12 and 16, the number of pixels representing the same object 12 is quadrupled and image resolution is apparently enhanced. Preferably, the required magnification and the pointing directions of the optical axis are calculated so that each sectional image is overlapped with adjacent sectional images, which allows compensation for the movement of the imaging system 11. In the present invention, the magnification of the imaging system is controlled by micromirror array lenses (MMALs), which provide a zoom function without any macroscopic servo mechanism, as shown in FIG. 4. Also, the optical axis is changed by the MMAL without additional camera system or a macroscopic servo mechanism, as shown in FIG. 6. The optical axis changing rate of the MMAL is so fast that for most cases, the movement of the object during multiple imaging sequences can be ignored. Objects in sectional object areas may have different distances from the imaging system. Herein, auto focusing can be applied when taking each sectional image to provide correct focus, which can be done readily using the MMAL, as shown in FIG. 9.

Figure 2:
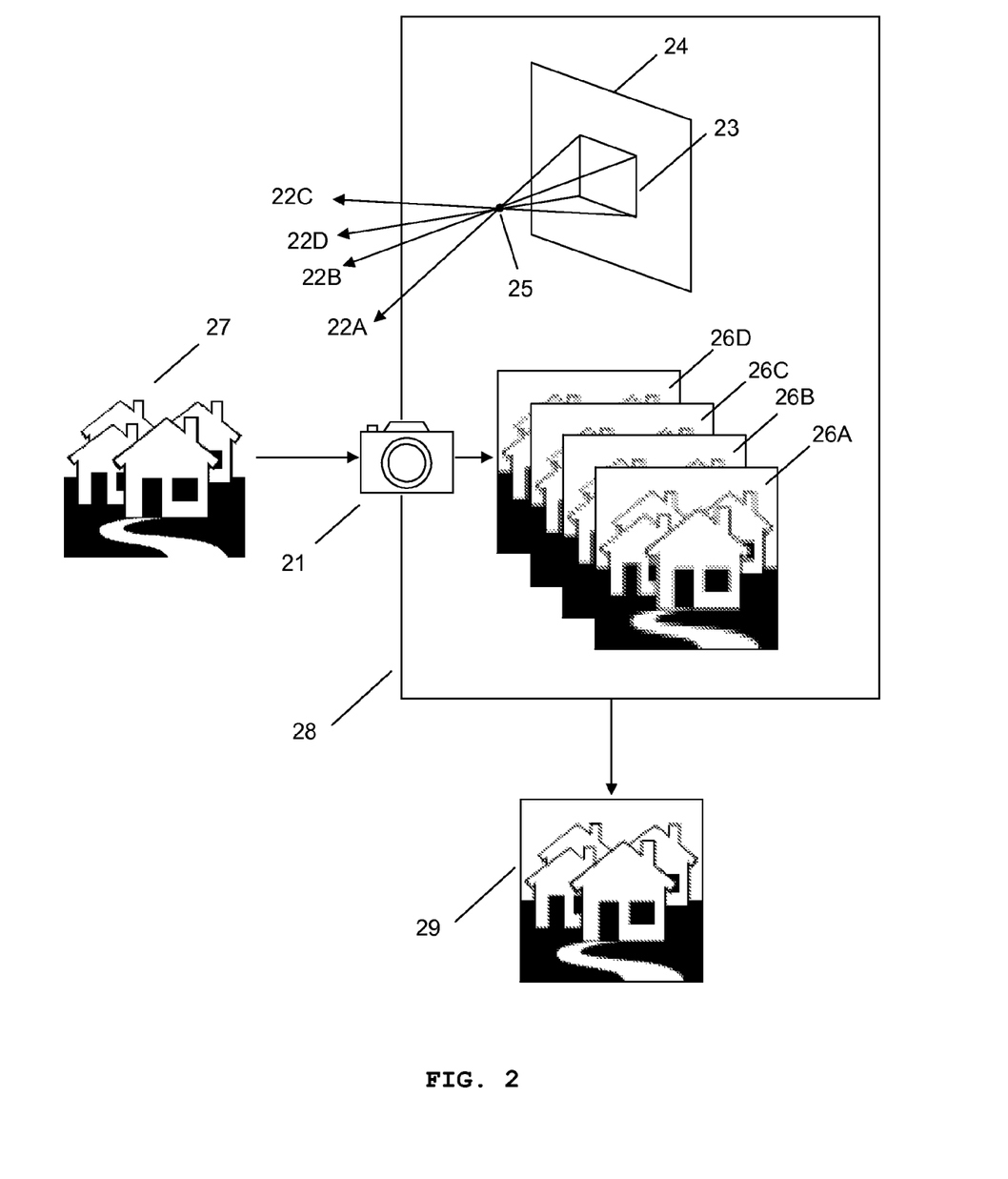
FIG. 2 shows an illustrative representation of an exemplary imaging system having a low resolution image sensor, which improves image resolution by a super resolution method.

FIG. 2 shows an exemplary imaging system 21 having a low resolution image sensor, which improves image resolution by a super resolution method. A user chooses a desired image resolution; preferably, integer times of image sensor resolution although it is not necessary. The desired image resolution determines other variables including the number of low resolution images and pointing directions of the optical axis. Values of variables can be calculated in real-time in an arithmetic unit or calculated in advance for predetermined resolutions and stored in the arithmetic unit. The highest feasible composite image resolution depends on the number of low resolution images and the range and minimum interval of the optical axis variation of the imaging system. The optical axis is changed in order to take multiple images with subpixel relative displacements. The image sampling rate is so fast that for most cases, the movement of the object can be ignorable. When the object moves more than the sub-pixel level, low resolution images need to be registered to one another with subpixel accuracy. For most super resolution algorithms, more image captured, higher resolution obtained to a certain extent. The low resolution images captured sent to an image processing unit to be fused to a single high resolution composite image. There are many algorithms available for data fusion as introduced by M. Elad and A. Feuer, "Restoration of a Single Superresolution Image from Several Blurred, Noisy, and Undersampled Measured Images," *IEEE Transactions on image processing*, Vol. 6, No. 12, December 1997.

An example of the super resolution method is shown in FIG. 2. In the example, horizontal and vertical resolutions of the image need to be increased by factor two, respectively. The arithmetic unit (not shown) generates four pointing directions of the optical axis of the imaging system in order to generate four images of the object with subpixel relative displacements. In this example, the directions of the optical axis 22A, 22B, 22C, and 22D are chosen as directions of the lines connecting the vertices of a pixel 23 centered in the image sensor 24 and the optical center 25 of the imaging system. The first image 26A of the object 27 is taken in the normal direction 22A of the optical axis by the low resolution image sensor 21. Then, the direction of the optical axis of the imaging system is changed by an angle corresponding to one pixel in the horizontal direction (22B) and the second image 26B is taken. The direction of the optical axis of the imaging system is further changed by an angle corresponding to one pixel in the vertical direction (22C) and the third image 26C is taken. Finally, the direction of the optical axis of the imaging system is changed by an angle corresponding to one pixel in the opposite horizontal direction (22D) and the forth image 26D is taken. These four images are sent to the image processing unit 28 and fused into a single high resolution composite image 29. In this example, four images are used and four times higher resolution image 29 is obtained. When the higher resolution is required, more optical axis changes with smaller scale need to be performed. The interval of optical axis change does not have to be even. Also, optical axis change is not necessarily limited to an angle corresponding to a subpixel size. However, when the angle of optical axis change is larger than the subpixel size, image registration is required. The optical axis is changed by the MMAL without a macroscopic servo mechanism, as shown in FIG. 6.

Figure 3:
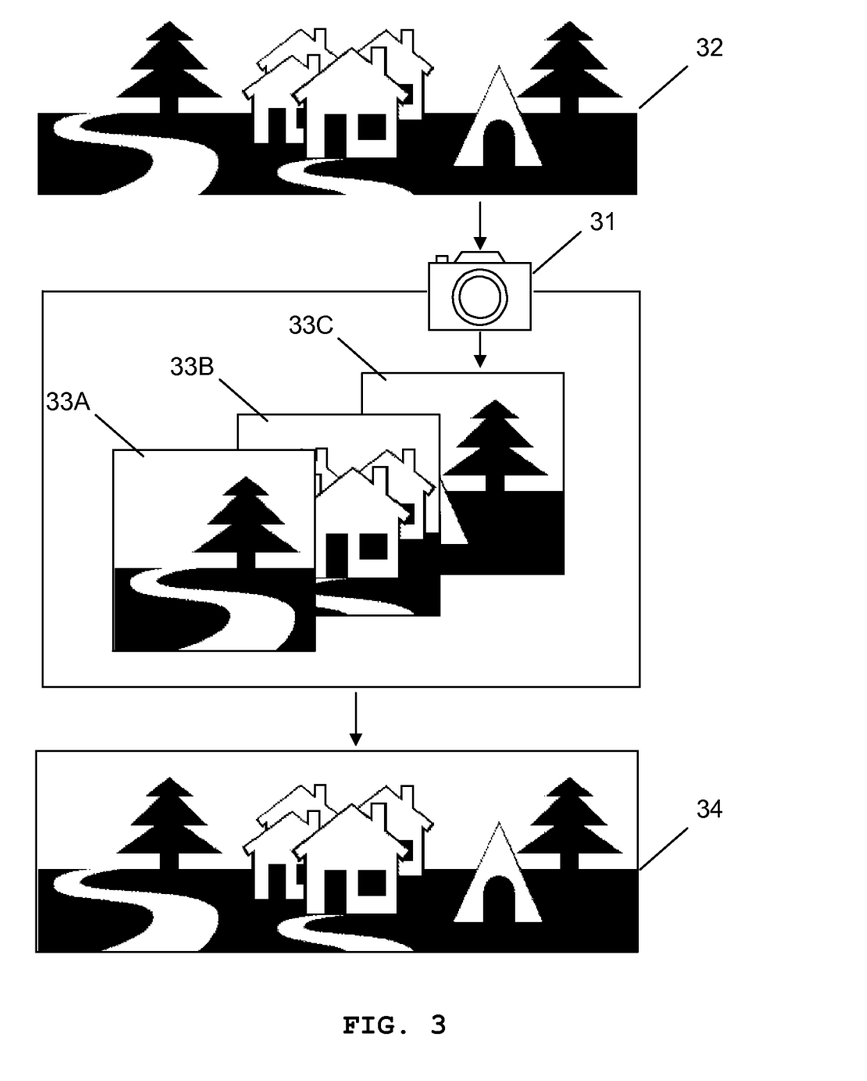
FIG. 3 shows an illustrative representation of an exemplary imaging system providing a wide angle of view image.

FIG. 3 shows an exemplary imaging system 31 providing a wide angle of view (panoramic) image using one or more MMAL. A user chooses a desired angle of view, which is wider than the normal angle of view of the imaging system. Since whole object area cannot be imaged at once, the area is divided into sectional object areas similarly to the mosaic method. The desired angle of view determines other variables including pointing directions of the optical axis. Values of variables can be calculated in real-time in an arithmetic unit or calculated in advance for predetermined angles of view and stored in the arithmetic unit. The widest feasible angle of view depends on optical axis variation range of the imaging system. Preferably, the pointing directions of the optical axis are calculated so that each sectional image is overlapped with adjacent sectional images, which allows compensation for the movement of the imaging system. An example generating a wide angle of view image is shown in FIG. 3. Assume that the imaging system 31 has a 50 degree normal angle of view and the user needs a 150 degree wide angle panoramic image. The object area 32 is divided into three sections. Then, sectional images 33A, 33B, and 33C are taken by changing the optical axis. These three images are sent to the image processing unit 34 and stitched to provide a single panoramic image. The optical axis is changed by the MMAL without an additional camera system or a macroscopic servo mechanism, as shown in FIG. 6. The optical axis changing rate of the MMAL is so fast that for most cases, the movement of the object during multiple imaging sequences can be ignored. Objects in sectional object areas may have different distances from the imaging system. Herein, auto focusing can be applied when taking each sectional image to provide correct focus, which can be done readily using the MMAL, as shown in FIG. 9.

FIG. 4 illustrates an imaging system which provides zoom in function (continuous magnification), optical axis change, and auto focusing function according to the preferred embodiment of the present invention using micromirror array lenses (MMALs). The imaging system takes an image from an object 41 by using a front lens 42, a first MMAL 43, a first auxiliary lens 44, a second MMAL lens 45, and a second auxiliary lens 46. The front lens 42 determines the field of view of the imaging system. The focal length of the first MMAL 43 is changed by controlling rotation and/or translation of its micromirrors 47. Thereby, the size of an object image 48 in the image plane 49 is varied. The focal length of the second MMAL 45 is changed by controlling rotation and/or translation of its micromirrors 47 in order to form the image in-focus in the image plane 49. The focal length of the first MMAL 43 and the second MMAL 45 are changed without macroscopic mechanical movements of lenses or time delay since each micromirror 47 of the MMALs 43 and 45 is actuated by electrostatic and/or electromagnetic force. The optical axis can be changed by controlling rotation and/or translation of micromirrors 47 of the MMALs 43 and 45, as will be explained in FIG. 6. Also, auto focusing can be performed by controlling rotation and/or translation of micromirrors 47 of the MMALs 43 and 45, as will be explained in FIG. 9. Further, each micromirror 47 of the first MMAL 43 and the second MMAL 45 are controlled to compensate for the aberration of the system. The auxiliary lenses 44 and 46 can be added to augment the field of view and the image resolution.

Figure 5A:
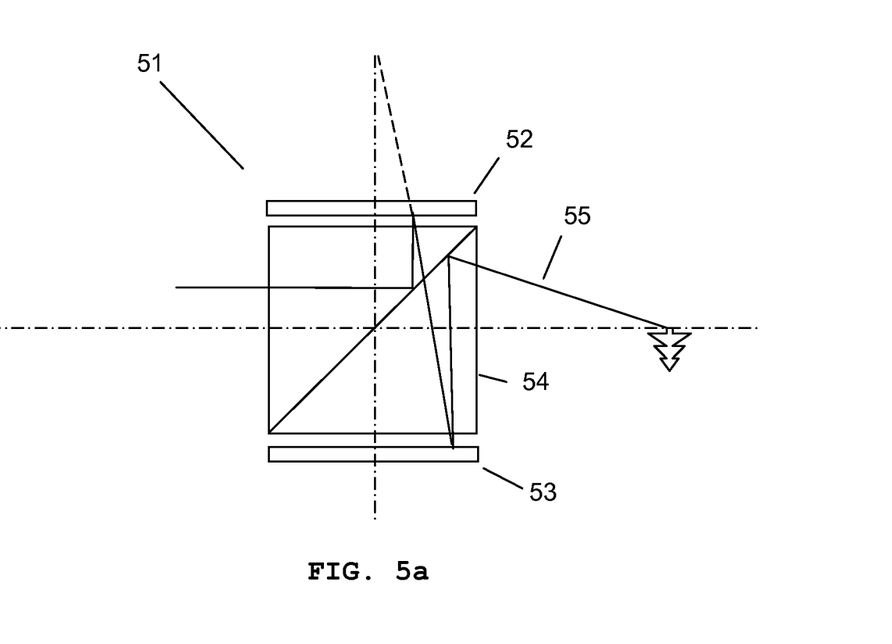
FIGS. 5a and 5b show the zoom systems of present invention using one or more MMALs.

FIG. 5a shows an imaging system 51, in which MMALs 52 and 53 are used as variable focal length lenses.

Because MMALs 52 and 53 are reflective types, it is impossible to make an in-line optical arrangement with MMALs 52 and 53. Therefore, the imaging system 51 includes a beam splitter 54 positioned in the path of light 55. The beam splitter 54 changes the direction of the light 55 by 90°, and thus simulates an in-line optical arrangement. As shown in FIG. 5a, the total size of the imaging system 51 is less than a conventional mechanical zoom imaging system because necessary separation requirements between the variator and the compensator and between the compensator and an imaging sensor can be satisfied by a beam splitter 54 and the MMALs 52 and 53 in a small space.

Figure 5B:
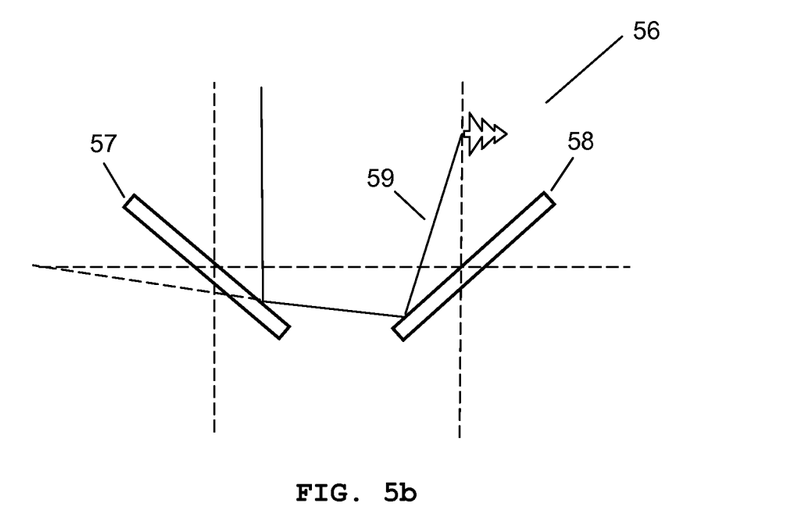

FIG. 5b shows an imaging system 56, in which MMALs 57 and 58 are used as variable focal length lenses 52, 53.

Since it is impossible to make an in-line optical arrangement with MMALs 57 and 58, MMALs 57 and 58 are positioned so that the path of the light 59 reflected by MMALs 57 and 58 is not blocked by other components. This arrangement also can reduce the total size of the imaging system 56.

Since the positions of MMALs 52, 53, 57, and 58 need not be changed, the imaging systems 51, 56 do not need space for lens movements, thus the imaging system 51 and 56 can be manufactured with a compact size. Also the power consumption of the imaging systems 51, 56 is minimal since there is no need to move MMALs 52, 53, 57, and 58.

The imaging systems 51 and 56 may include five groups of lenses to get necessary performances of a zoom system instead of two variable focal length lenses. They are a focus lens group, variator lens group, compensator lens group, erector lens group and relay lens group. Even though the imaging system using MMALs is explained with two lenses, actual imaging system using MMALs also has some groups of lenses.

Figure 6A:
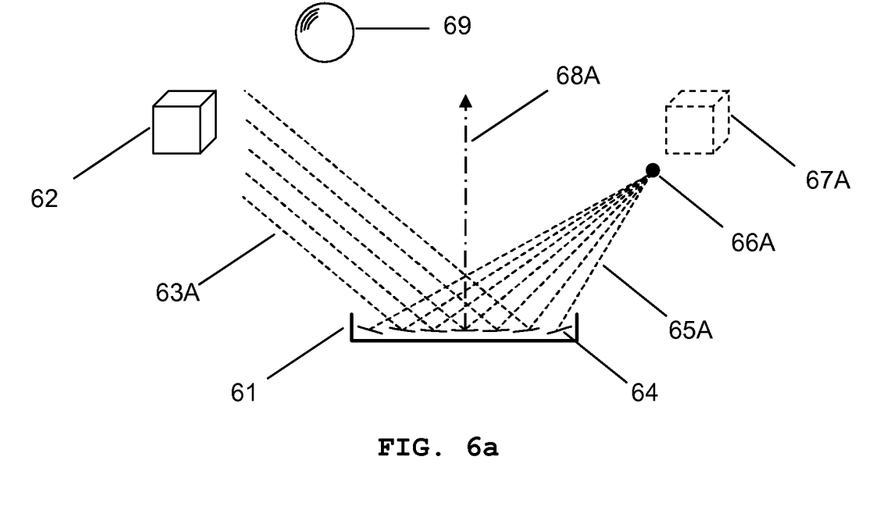
FIGS. 6a and 6b are schematic representations for optical axis changes in the MMAL.

The FIG. 6 shows how the optical axis of the MMAL changes. A bunch of light is focused by the MMAL 61. In FIG. 6a, a cube object 62 is imaged onto the image plane. The light 63A from the object 62 is reflected by each of the micromirror 64. The reflected light 65A is focused onto the focal point 66A of the image and finally makes an image of a cube 67A in the image sensor. During the focusing process the optical axis is defined as a surface normal direction 68A of a micromirror 64.

Figure 6B:
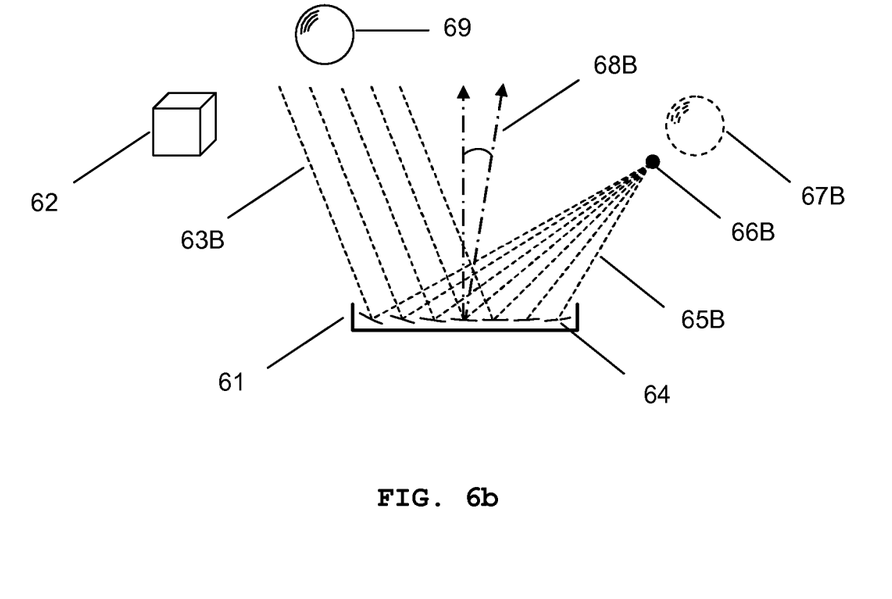

As shown in FIG. 6b, the MMAL can make a different image 67B from a different object 69 without macroscopic movements. By changing the respective angles of the micromirrors 64, this time the MMAL accepts the light 63B from the sphere 69. The reflected light 65B is focused onto a focal point 66B and makes the image of the sphere 67B. This time the optical axis is changed by an angle and becomes the surface normal direction 68B of a micromirror.

Figures 7A, 7B:
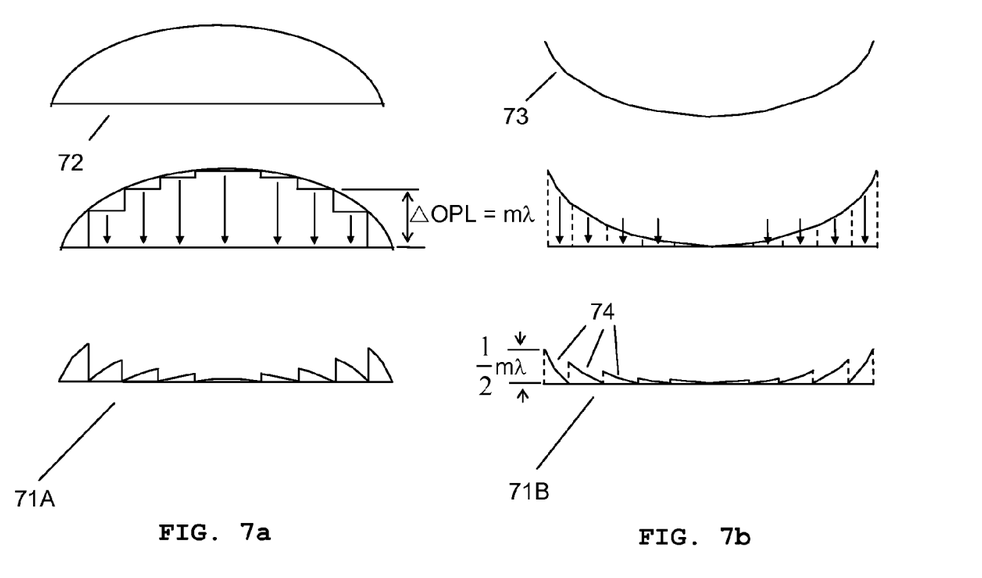
FIG. 7a is a schematic diagram showing how a refractive Fresnel lens replaces an ordinary single-bodied lens.
FIG. 7b is a schematic diagram showing how a reflective Fresnel lens replaces an ordinary single-bodied mirror.

FIG. 7a schematically shows how a refractive Fresnel lens 71A replaces an ordinary single-bodied lens 72. FIG. 7b shows how a reflective Fresnel lens 71B, replacing an ordinary single-bodied mirror 73, is formed with a MMAL. The MMAL includes a plurality of micromirrors 74, and each micromirror 74 is controlled to form a reflective Fresnel lens 71B and to change the focal length of the lens.

In order to obtain a bright and sharp image, the variable focal length MMAL must meet the two conditions for forming a lens. One is that all the rays should be converged into the focus, and the other is that the phase of the converged rays must be the same. Even though the rays have different optical path lengths, the same phase condition can be satisfied by adjusting the optical path length difference to be integer multiples of the wavelength of the light. Each facet converges rays to one point, and rays refracted or reflected by different facets have an optical path length difference of integer multiples of the incident light.

To change the focal length of the MMAL, the translational motion and/or the rotational motion of each of the micromirrors are controlled to change the direction of light and to satisfy the phase condition of the light.

The variable focal length MMAL is also an adaptive optical component compensating the aberration of the zoom system by controlling the translational motion and/or the rotational motion of each micromirror.

Figure 8A:
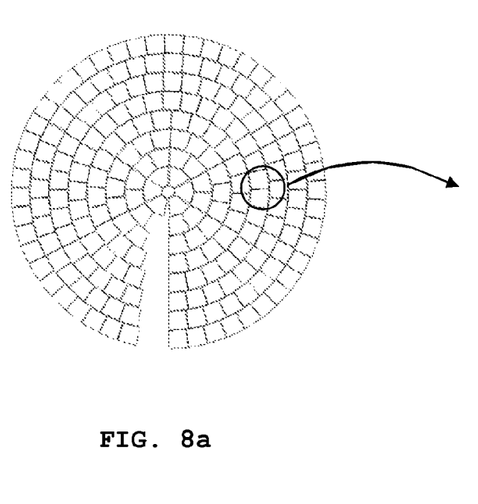
FIG. 8a is a schematic plan view showing a variable focal length MMAL that is made of many micromirrors.
Figure 8B:
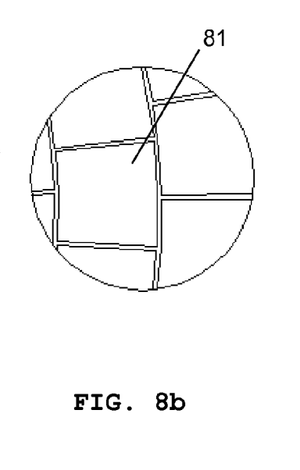
FIG. 8b is an enlarged detail plan view of the micromirrors.

FIGS. 8a and 8b show that the micromirrors 81 are arranged to form many concentric circles. The micromirrors 81 are arranged in a flat plane as shown in FIG. 7b.

The MMAL used in the present invention has advantages: (1) the MMAL has a very fast response time because each micromirror has a tiny mass; (2) the MMAL has a large focal length variation because large numerical aperture variations can be achieved by increasing the maximum rotational angle of the micromirror; (3) the MMAL has a high optical focusing efficiency; (4) the MMAL can have a large size aperture without losing optical performance. Because the MMAL includes discrete micromirrors, the increase of the lens size does not enlarge the aberration caused by shape error of a lens; (5) the cost is inexpensive because of the advantage of mass productivity of microelectronics manufacturing technology; (6) the MMAL can compensate for the aberration of the system; (7) the MMAL makes the focusing system simple; (8) the MMAL requires small power consumption when electrostatic actuation is used to control it.

Figure 9A:
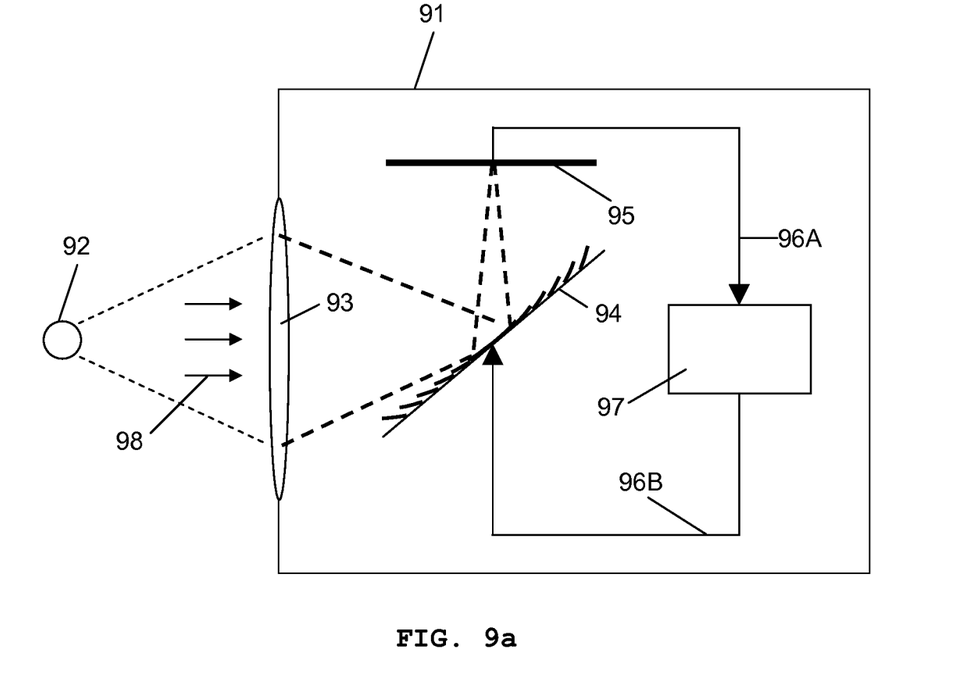
FIG. 9a is a schematic view of an imaging device having an auto focusing lens system in accordance with the present invention.

FIG. 9a illustrates the operation of an auto focusing system 91 according to the invention. First, the light scattered from the object 92 is refracted by the lens 93 and is reflected by the MMAL 94 to the image sensor 95. The light reflected from the MMAL is received by the image sensor 95 and converted into an electrical signal 96A carrying the object's image data. The electrical signal is then sent to the signal processor 97, where the image data is analyzed and compared to the camera focus criteria. Based on the compared image data, as discussed in further detail below, the signal processor 97 generates a control signal 96B. The control signal is sent to the MMAL to adjust the focal length of the MMAL.

Figure 9B:
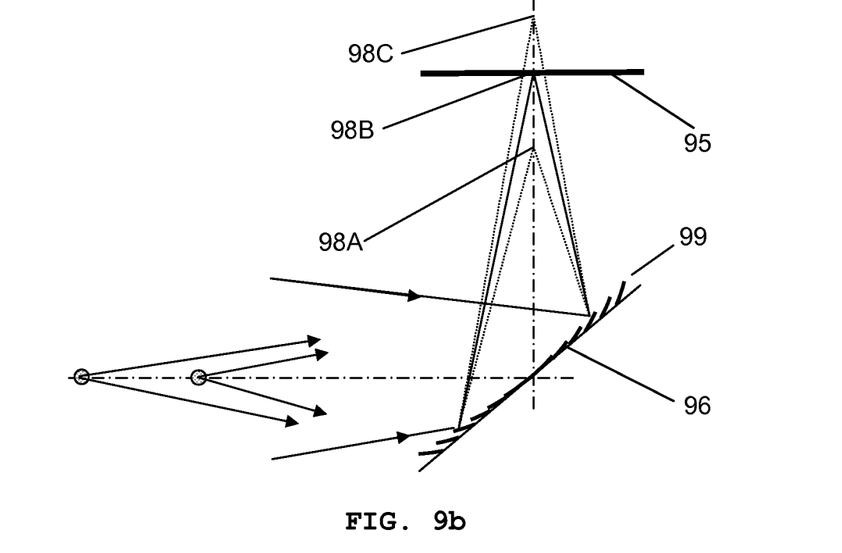

As shown in FIG. 9b, the focal length of the MMAL 94 affects the quality of the image received by the image sensor 95. For instance, if the MMAL has a focal length which causes the reflected light 98 to be in-focused at a point 98A short of the image sensor 95, the image sensor will generate an electrical signal 96A carrying "blurred" image data. Accordingly, the signal processor will process the "blurred" signal and send a control signal 96B to the MMAL, causing the positions of the micromirrors 99 to adjust to lengthen the focal length of the MMAL.

Similarly, if the focal length of the MMAL causes the reflected light to be in-focused at a point 98C behind the image sensor 95, the image sensor will likewise generate an electrical signal 96A carrying "blurred" image data. Accordingly, the signal processor will process the "blurred" signal and send a control signal 96B to the MMAL, causing the arrangement of the micromirrors 99 to adjust to shorten the focal length of the MMAL.

In that regard, the focal length of the MMAL is adjusted in an iterative process until the reflected light is in-focused at a point 98B on the image sensor, which provides a "sharp" image, satisfying the camera focus criteria. The iterative process is preferably completed within the persistent rate of the human eye. Thus, the signal processor must have a speed equal to or grater than the product of the number of iterative adjustments and the persistent rate of the human eye.

Generally, the response of an automatic focusing system is not limited by the speed of the signal processor but rather by the speed of the focusing mechanism. In conventional automatic focusing systems, a control signal is sent to a motor and/or piezoelectric actuator to control the position of a lens or lens system. Therefore, the response time of conventional auto focusing systems is a function of the image processing time and the time it takes to control the position of the lens.

The auto focusing time of the present invention is almost a function of the image processing time because the focal length change speed of the MMAL is much faster than the imaging processing speed. Accordingly, the auto focusing time of the present invention is improved over conventional auto focusing systems.

What is claimed is:

1. An imaging system for improving image resolution comprising:
   a) a lens system comprising a first micromirror array lens (MMAL) comprising a plurality of micromirrors and a second MMAL comprising a plurality of micromirrors, wherein the first MMAL is configured to change an optical axis of the imaging system by controlling the micromirrors in order to form a plurality of sectional images of an object;
   b) an image sensor, configured to sense the sectional images, wherein the second MMAL is configured to form the in-focus sectional images on the image sensor by controlling the micromirrors; and
   c) an image processing unit, communicatively coupled to the image sensor, configured to process the sectional images sensed by the image sensor and combine the sectional images to generate a composite image with high resolution.

2. The imaging system of claim 1, wherein at least one of the first MMAL and the second MMAL is further configured to change a magnification of the imaging system by controlling the micromirrors.

3. The imaging system of claim 1, wherein directions of the optical axis of the imaging system are changed so that each sectional image is overlapped with adjacent sectional images to compensate for the movement of the imaging system.

4. The imaging system of claim 2, further comprising an arithmetic unit calculating the magnification and directions of the optical axis of the imaging system based on a desired image resolution.

5. The imaging system of claim 2, wherein the sectional images are taken by changing the optical axis and the magnification of the imaging system.

6. The imaging system of claim 1, wherein the micromirrors of the first MMAL and the second MMAL have two degrees of freedom rotation and one degree of freedom translation.

7. The imaging system of claim 1, wherein each micromirror of the first MMAL and the second MMAL is actuated by electrostatic force.

8. The imaging system of claim 1, wherein the aberration of the imaging system is corrected by controlling the micromirrors in at least one of the first MMAL and the second MMAL.

9. The imaging system of claim 1, wherein at least one of the first MMAL and the second MMAL compensates for the aberration caused by phase errors of light introduced by a medium between the object and its image.

10. The imaging system of claim 1, wherein at least one of the first MMAL and the second MMAL compensates for the aberration caused by the defects of the imaging system that makes the sectional images deviate from the rules of paraxial imagery.

11. The imaging system of claim 1 further comprising optical filters for image enhancement.

12. The imaging system of claim 1 further comprising a beam splitter positioned between the first MMAL and the second MMAL.

13. The imaging system of claim 1, wherein the first MMAL and the addition second MMAL are positioned so that the path of the light reflected by the first MMAL and the additional second MMAL is not blocked.

14. The imaging system of claim 1 further comprising an auxiliary lens or lenses for changing a field of view of the imaging system.

15. The imaging system of claim 1 further comprising an auxiliary lens or lenses for the enhancement of image resolution.

16. The imaging system of claim 1 further comprising an auxiliary lens or lenses to correct the aberration of the imaging system.

17. The imaging system of claim 1 providing auto focusing function, wherein the focus of each sectional image is corrected.

18. The imaging system of claim 1, wherein the optical axis of the imaging system is changed so that the sectional images have subpixel relative displacements wherein the image processing unit fuses the sectional images to generate the composite image with high resolution.

19. The imaging system of claim 18 further comprising an arithmetical unit calculating the directions of the optical axis of the imaging system based on a desired image resolution.

20. The imaging system of claim 18, wherein when the object moves more than a sub-pixel level, the image processing unit registers the sectional images received from the image sensor to one another with subpixel accuracy.

21. The imaging system of claim 1, wherein the optical axis of the imaging system is changed by the first MMAL such that the composite image has a wide angle of view.

* * * * *